L. BROWN.
Sulky-Plow.
No. 226,705. Patented April 20, 1880.
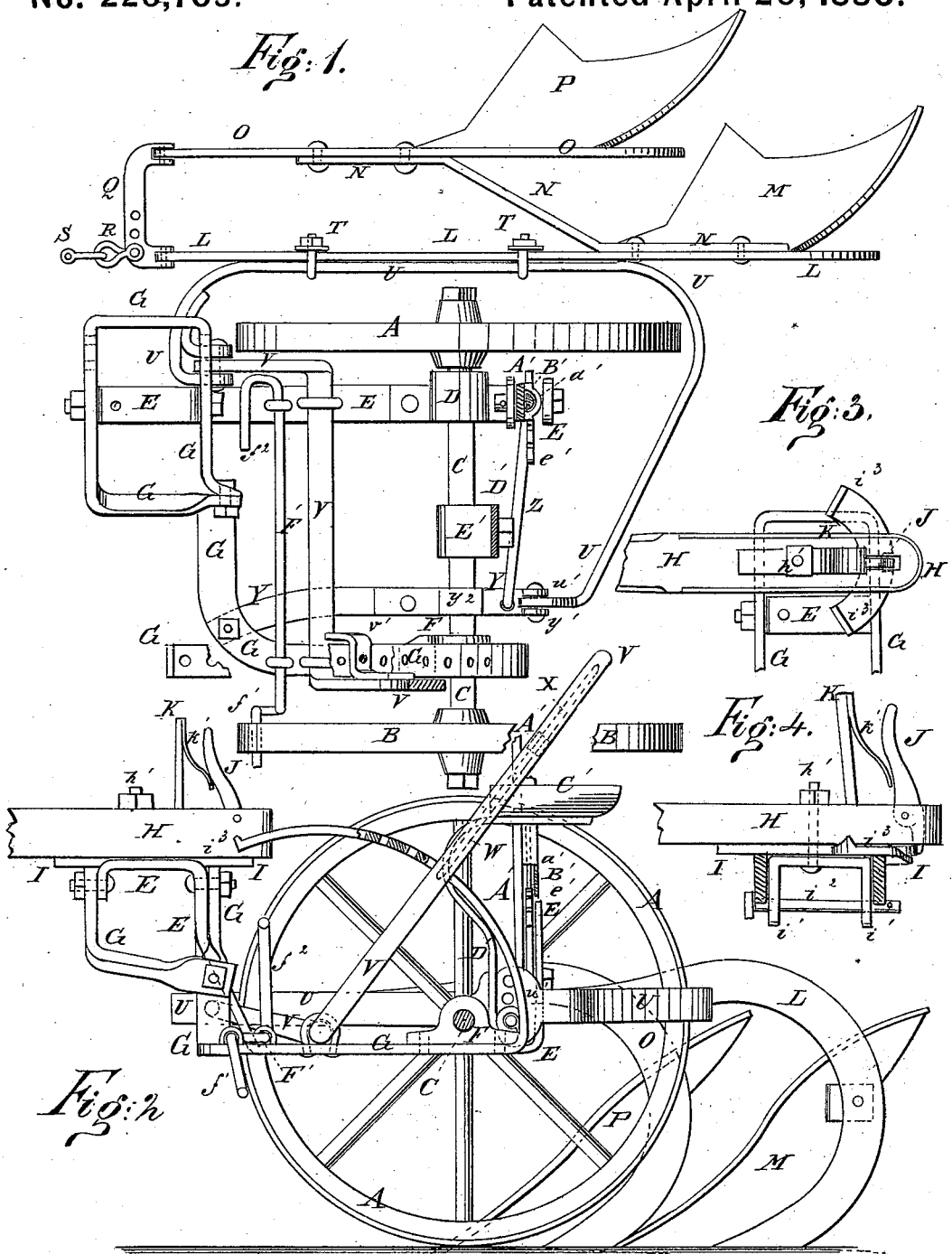

UNITED STATES PATENT OFFICE.

LEROY BROWN, OF WAITSBURG, WASHINGTON TERRITORY.

SULKY-PLOW.

SPECIFICATION forming part of Letters Patent No. 226,705, dated April 20, 1880.

Application filed September 18, 1879.

*To all whom it may concern:*

Be it known that I, LEROY BROWN, of Waitsburg, in the county of Walla Walla, Washington Territory, have invented a new and useful Improvement in Sulky-Plows, of which the following is a specification.

Figure 1 is a top view of my improved plow, parts being broken away to show the construction. Fig. 2 is a side view of the same, the near wheel being removed. Fig. 3 is a detail view of the rear end of the tongue and its attachments. Fig. 4 is a side view of the same, partly in section, to show the construction.

Similar letters of reference indicate corresponding parts.

The object of this invention is to furnish an improved sulky-plow which shall be so constructed that it may be readily adjusted and controlled by the driver, and which shall be simple in construction, strong and durable, and reliable in use.

A B represent the wheels, which revolve upon the journals of the axle C. To the axle C, at the inner side of the off wheel A, is attached a casting, D, to the lower side of which is bolted a bar, E, which projects forward, and at the forward side of the wheel A is curved upward, and then bent forward into a horizontal position, and its end is bent downward at right angles. To the axle C, at the inner side of the near wheel B, is attached a casting, F, to the lower side of which is bolted a bar, G, which projects forward, and at the forward side of the wheel B is curved inward, and then upward and outward, is bolted to the upper end of the curved part of the bar E, is bent twice at right angles, is bolted to the bent-down end of the bar E, is curved downward and inward, and its end is bolted to the curved middle part of itself. The two bars E G thus form a support for the tongue H, which is pivoted near its rear end to a plate, I, by a bolt, $h'$. To the lower side of the plate I are attached, or upon it are formed, lugs $i'$, which project downward within the loop formed by the bar G, and have holes in their lower ends to receive the bolt $i^2$, which rests in notches in the lower edge of the said bar G.

Several notches are formed in the edge of the bar G, to receive the bolt $i^2$, so that the tongue H may be adjusted laterally, as may be required.

In a slot or mortise in the rear end of the tongue H is pivoted a short upright lever, J, the lower end of which enters a notch in the rear edge of the plate I and of the curved bar $i^3$, rigidly attached to the lower side of the rear end of the said plate I, to hold the tongue H parallel with the line of draft. By withdrawing the lower end of the lever J from the notch in the plate I and bar $i^3$ the tongue H may be turned upon the bolt $h'$ to allow the machine to be turned in a smaller space than would otherwise be possible, the end of the lever J sliding along the rear edge of the plate I and bar $i^3$, and dropping into the said notch when the tongue H again comes parallel with the line of draft.

The ends of the bar J are bent upward to serve as stops to limit the movement of the tongue H. The upper end of the lever J is pressed to the rearward by a spring, $k'$, attached to a small upright, K, the lower end of which is attached to the tongue H.

L is the plow-beam, the rear end of which is curved downward, and has a plow, M, attached to it.

To the outer side of the beam L is attached the rear part of a bar, N, which bar is inclined outward and forward, and its forward part is attached to the plow-beam O of a second plow, the inclined part of the said bar N being made of such a length as to bring the plow-beams L O to the proper distance apart. The rear end of the plow-beam O is curved downward, and to it is attached a plow, P. The plow-beam O is made so much shorter than the plow-beam L as to bring the plow P to the proper distance in front of the plow M.

The forward ends of the plow-beams O L are directly opposite each other, are bent downward, and have a number of holes formed through them to receive the bolts by which the rearwardly-bent forked ends of the draw-bar Q are secured to them, so that the said draw-bar Q may be adjusted higher or lower to cause the plows to work deeper or shallower in the ground, as may be desired. The draw-bar Q has a number of holes formed in it to receive the clevis R, so that the said clevis may be adjusted to bring the line of draft into line with the center of resistance. The clevis R is twisted to bring its bend into proper position to receive the double-tree clevis S.

The middle part of the plow-beam L is firmly secured by two clamps, T, to a bar, U, which passes across the outer side of the off wheel A. The forward end of the bar U is bent inward and rearward, so as to pass around the forward part of the wheel A, and is forked to receive the end of the arm of the bent lever V, which is pivoted to it, so that the plows M P may be adjusted to raise and lower the plow-points by operating the said lever V. The lever V works in bearings attached to the horizontal parts of the bars E G, and the arm formed upon its other end projects into such a position that it may be conveniently reached and operated by a driver sitting upon the seat or walking in the rear of the machine.

The rear part of the bar U is curved inward to pass around the rear part of the off wheel A, extends nearly to the near wheel B, and has a vertical cross-head, $u'$, formed upon its end. Several holes are formed in the cross-head $u'$, to receive the bolt or pin by which it is connected with the lugs $y'$, formed upon the rear end of the bar Y, so that the plows can be leveled by adjusting the cross-head end of the bar U higher or lower. The bar Y is connected near its rear end with the axle C by a keeper, $y^2$, and its forward end is pivoted to the inwardly-curved part of the bar G. To the rear end of the bar Y is pivoted the end of a connecting-rod, Z, the other end of which is pivoted to the lever A'. The lever A' is pivoted at a little distance from its lower end to the upwardly-projecting rear end of the bar E, so that the rear part of the bar U can be moved in and out to cause the plows to take and leave land by operating the lever A'.

C' is the driver's seat, which is attached to the upper end of the spring-standard D'. The lower end of the spring-standard D' is attached to a casting, E', which is attached to the axle C. To the bars E G is pivoted the brake-shaft F', upon the near end of which is formed a crank-arm, $f'$, to carry the brake-shoe, so that the brake may be applied to and withdrawn from the near wheel by turning the shaft F' in its bearings. Upon the off end of the brake-shaft F' is formed a lever, $f^2$, the upper end of which is so formed that the driver with his foot can operate it to apply and withdraw the brake.

With this construction, by applying the brake, the near wheel B will be checked, while the off wheel A is left free, so that the plows will be made to move inward or toward the land.

Having thus fully described my invention, I claim as new and desire to secure by Letters Patent—

1. The combination of the pivoted bar Y and the sliding keeper $y^2$ with the bar G, the axle C, and the cross-head $u'$, provided with a number of holes and formed upon the rear end of the bar U, which passes around the off wheel A, and with which the plow-beam L is connected, substantially as herein shown and described.

2. The combination of the lever A' and the connecting-bar Z with the rear end of the bar E, the pivoted bar Y, the sliding keeper $y^2$, and the bar U, which passes around the off wheel A, and with which the plow-beam L is connected, substantially as herein shown and described.

LEROY BROWN.

Witnesses:
J. F. BOOTHE,
DAVID ROBERTS.